United States Patent Office  
2,794,792  
Patented June 4, 1957

2,794,792

GLASS FIBER REINFORCED RUBBER-RESIN PRODUCT

Charles L. Petze, New Castle, Del., assignor to Delaware Research & Development Corporation No Drawing. Application July 21, 1952, Serial No. 300,132

6 Claims. (Cl. 260—41.5)

The present invention relates to vulcanized products of a vulcanizable elastic rubber, a reactive and compatible resin and a substantial proportion of glass fiber reinforcement. The product is characterized by superiority in impact strength, elastic recovery, cut and abrasion resistance, and dimensional stability.

This application is a continuation-in-part of application Serial No. 216,413, filed March 10, 1951, abandoned in view of application Serial No. 300,133, filed July 21, 1952 (now Patent No. 2,617,129), and application Serial No. 242,177, filed August 16, 1951, now abandoned.

Vulcanized compounds comprising elastic rubbers and resins have been previously known. It has also been known that the properties of such compounds can be varied and economy effected through the use of clay, carbon black and similar fillers. It is, however, believed novel to utilize glass fibers in rubber-resin compositions with peculiarly useful enhancement of their properties over anything previously attainable.

Glass fibers are in common use for the reinforcement of relatively rigid thermosetting resins such as melamine formaldehyde, phenol formaldehyde and polyester resins. Glass fibers in the form of mats and woven cloth have been employed in making up laminates, because of the high flexural and tensile strength obtainable by combining glass fibers with thermosetting resins. In such cases of rigid resins reinforced with glass fibers the modulus of elasticity and elongation at failure of the laminate approach those of the glass fiber, and the resin serves merely as a binder, but in the composition of this invention the modulus of elasticity is much lower than that of the glass fiber and the elongation at failure is much greater.

The unexpected useful properties which have now been discovered concern the behavior of the vulcanized material at strains greatly exceeding those of which the glass fiber itself is capable.

The special use of glass fibers in the present invention is significantly different in the length of the fibers. For useful reinforcement of rigid resins, that is, the attainment of high tensile and flexural strength, the length of the fiber cannot be less than about one inch, but in the composition of this invention the reinforcing effects are produced by fibers very much shorter than one inch.

It is understood that the relative proportions of rubber, resin, curing agent and filler will determine the hardness or the elastic modulus of the compounds under consideration. Where for a specific application a certain hardness range in the cured compound is desired, the relative proportions of said components can be varied to obtain the optimum in some other property, such as tensile strength or cut resistance, while holding the hardness in the desired range. The outstanding advantages obtained by the use of glass fiber as a reinforcement for vulcanized elastomer-resin compounds are clearly brought out by comparison with other compounds of equal hardness. On this equal hardness basis of comparison it has now been found that when fiber glass reinforcement is used, there is superiority over the optimum obtainable in the unreinforced elastomer-resin compound (with or without the usual particulate mineral fillers) with respect to: (1) impact strength, (2) elastic recovery, (3) cut resistance, (4) abrasion resistance, (5) dimensional stability, and (6) tack retention.

A further important advantage of these fiber glass reinforced compounds is that they are dimensionally stable at elevated temperature. This property is important in processing because the compounds can be cured without external pressure, and do not expand and develop porosity in the manner of unreinforced compounds.

The following comparative test data demonstrate the beneficial effects obtained with glass fiber reinforcement. The weight of filler used was adjusted to provide stocks of equal modulus of elasticity (stiffness). The C411 composition containing glass flock is a standard one for this invention. The C414 and C415 compositions are the same basic composition except that the glass flock was replaced by 70 and 100 parts per 100 parts of rubber-resin, respectively, of particulate filler:

TABLE A

| Ingredients | C411 | C414 | C415 |
| --- | --- | --- | --- |
| GR-S rubber | 40 | 40 | 40 |
| High styrene-butadiene resin | 60 | 60 | 60 |
| Stearic acid | 1 | 1 | 1 |
| Zinc oxide | 4 | 4 | 4 |
| Glass fiber flock | 50 | | |
| Silene EF (hydrated calcium silicate) | | 70 | 100 |
| Altax (benzothiazyl disulfide) | 1.63 | 1.63 | 1.63 |
| Tuads (tetramethyl thiuram disulfide) | 1.10 | 1.10 | 1.10 |
| Sulfur | 2.60 | 2.60 | 2.60 |
| Cure 15 min. at 300° F.: | | | |
| Flexural Strength, p. s. i.[1] | 4,100 | 4,400 | 4,500 |
| Deformation at break, in.[1] | [3] 1.0 | 0.62 | 0.40 |
| Modulus of Elasticity, p. s. i.[1] | 254,000 | 235,000 | 290,000 |
| Impact Strength for lbs./in. of notch [2] | 3.1 | 1.2 | 0.4 |
| Hardness, Shore D | 74 | 75 | 77 |

[1] ASTM D-790.
[2] ASTM D-256.
[3] Did not break in 90° bend.

The data show conclusively a very marked difference between the standard stock (C411) of this invention and the comparable stocks having equal modulus of elasticity basic compositions. It will be noted that the standard stock is markedly superior in both deformation at break and impact strength. These superiorities are of practical importance wherever resistance to impact, resistance to cut, and elasticity coupled with long range distensibility are required. The last-mentioned combination of properties affords outstanding tack, or other driven fastener, retentivity.

The compositions which have been found to be especially suitable in providing the properties explained above are vulcanizates in which the butadiene-styrene rubbery copolymer commonly known as "GR–S" synthetic rubber is the elastomer component, and a resinous copolymer of styrene and butadiene with the styrene predominant is the resinous component, and glass fiber supplies the reinforcement. In this composition a substantial proportion of polymerized styrene may be mixed with the resinous copolymer of styrene and butadiene. The following examples are illustrative of compositions coming within the scope of this invention, the percentages being given by weight.

*Example I*

| | Percent |
| --- | --- |
| GR–S rubber | 24.78 |
| Styrene-butadiene resin ("Pliolite S–6") | 37.18 |
| Glass fiber flock | 34.08 |
| Color | 0.62 |
| Benzothiazyl disulfide (Altax) | 0.37 |

|                                            | Per cent |
|--------------------------------------------|----------|
| Stearic acid                               | 0.50     |
| Zinc oxide                                 | 1.24     |
| Tetramethyl thiuram disulfide (Tuads)      | 0.25     |
| Sulfur                                     | 0.98     |

*Example II*

|                                            | Percent |
|--------------------------------------------|---------|
| GR–S rubber                                | 24.7    |
| Styrene-butadiene resin ("Pliolite S–6")   | 22.2    |
| Polystyrene                                | 14.3    |
| Glass fiber flock                          | 30.6    |
| Color                                      | 0.5     |
| Reogen (mixture of an oil-soluble sulfonic acid and a paraffin oil) | 1.2 |
| Stearic acid                               | 0.7     |
| Altax (benzothiazyl disulfide)             | 1.0     |
| Zinc oxide                                 | 2.5     |
| Methyl Tuads (tetramethyl thiuram disulfide) | 0.7   |
| Sulfur                                     | 1.6     |

*Example III*

|                                            | Percent |
|--------------------------------------------|---------|
| GR–S rubber                                | 42.00   |
| Resinous copolymer of styrene and butadiene | 23.00  |
| Glass fiber flock                          | 30.00   |
| Stearic acid                               | 0.75    |
| Zinc oxide                                 | 2.00    |
| Benzothiazyl disulfide (Altax)             | 0.60    |
| Tetramethyl thiuram disulfide (Tuads)      | 0.40    |
| Sulfur                                     | 1.25    |

*Example IV*

|                                            | Percent |
|--------------------------------------------|---------|
| Neoprene type GN–A (polychloroprene)       | 40.2    |
| Resinous copolymer of styrene and butadiene | 22.7   |
| Glass fiber flock                          | 29.9    |
| Piperidinium pentamethylene dithiocarbonate | 0.1    |
| p-(p-Tolyl-sulfonylamido)-diphenylamine    | 0.4     |
| Heliozone wax (a greenish, waxy material used to retard sun-checking and cracking of natural and synthetic rubber, produced by E. I. du Pont de Nemours & Co.) | 0.4 |
| Magnesium oxide                            | 1.6     |
| Zinc oxide                                 | 3.2     |
| Benzothiazyl disulfide (Altax)             | 0.4     |
| 2-mercapto imidazoline                     | 0.4     |
| Sulfur                                     | 0.4     |

These compounds are mixed by conventional procedures, using either a two-roll mill or a Banbury mixer. The rubber and resin are mixed thoroughly and then the glass fiber flock is added. The compounds may be extruded, calendered or molded, depending on the shape desired, and are then vulcanized. Time and temperature of vulcanization will depend on the vulcanizing agents used and the thickness of the material. For example, a satisfactory cure of the compositions given in the above examples in sheets of ⅛ inch to ¼ inch thickness is obtained in a mold at 350° F. for 7 minutes.

The vulcanized material with the composition of Example I, has the following properties:

| | |
|---|---|
| Tensile strength p. s. i | 2760 |
| Hardness, Shore D | 72 |
| Abrasion index (ASTM Method D–394B), percent | 39 |
| Cut resistance, load [1] lbs | 790 |
| Cut resistance, compression [1] percent | 70 |
| Impact strength, notched Izod ft. lbs./in | 6.6 |

[1] Bell Telephone Lab.-Scott Compression Cut Test, U. S. Coast Guard Tool.

This material has outstanding tack holding properties as shown in said application Serial No. 216,413. It has furnished an outstanding material for the construction of shoe lasts and for repairing wooden shoe lasts. In addition, when used as a cutting block or clicker pad to back material such as leather being cut to shape, it has a life surpassing that of any other known material, and far outlasts the wooden blocks commonly used. This material is also useful as a mallet head for shaping metal sheet and similar operations in which it is desired to apply an impact without scratching or cutting the metal. Mallet heads made of this novel material far outlast the conventional raw hide or hard rubber types now commonly used. From these examples it is obvious that this new material will be useful for many purposes requiring the combination of high impact strength, cut resistance, elastic recovery, and abrasion resistance.

The composition of Example II uses polystyrene in place of part of the resinous styrene-butadiene copolymer. The properties are similar to those of the material obtained from Example I.

The composition of Example III is representative of softer, more flexible material reinforced with glass fiber which can be made by increasing the proportion of the elastomeric component with respect to the resinous component. The properties follow:

| | |
|---|---|
| Tensile strength p. s. i | 1600 |
| Elongation percent | 170 |
| Hardness, Shore D | 40 |
| Abrasion Index (ASTM Method D–394B) percent | 34 |
| Dimensional change: [1] | |
| Mill direction percent | −0.035 |
| Cross direction do | −0.115 |
| Cut resistance, load [2] lbs | 650 |
| Cut resistance, compression percent | 78 |

[1] Percent change in length following exposure for 7 days to 70° C.
[2] Bell Telephone Lab.-Scott Compression Cut Test, U. S. Coast Guard Tool.

When the composition of Example III is calendered to a thickness of ⅛ inch to ¼ inch and cured in a press or in continuous pressing equipment, a flexible, resilient sheet material is obtained which is valuable as a high quality floor covering. As is evident from the data given above, this material has an outstanding combination of properties which are important in this use. While it is possible to obtain by the proper selection of the proportions of elastomer, resin and the usual particulate filler, such as clay, a floor covering with equivalent hardness and resilience, it has been found that the use of glass fiber reinforcement gives outstanding abrasion resistance, cut resistance and dimensional stability, properties obviously desirable in a material intended for use as a floor covering.

The composition of Example IV in which the elastomer used is neoprene in place of GR–S rubber results in a vulcanized material with properties similar to those in Example III. Here again the use of glass fiber as a reinforcing agent gives a product of superior cut and abrasion resistance and dimensional stability.

It is to be expected from the data set forth regarding these examples that the beneficial effects of the use of glass fiber as a reinforcing agent would be found in vulcanizable elastomer-resin compositions in which other elastomers and resins are used. Elastomers, in addition to the GR–S rubber and chloroprene (neoprene) used in the above examples, include rubbery copolymers of butadiene and acrylonitrile such as those sold under the trade names of "Paracril" or "Chemigum," isoprene-isobutylene copolymers i. e., the class of conjugated diolefin polymers, and organic polysulfides. Resins which may be used, in addition to polystyrene and the resinous copolymers of styrene and butadiene shown in the examples, include phenol formaldehyde and resorcinol formaldehyde resins, resinous copolymers of butadiene and acrylonitrile in which the acrylonitrile predominates, and acrylic acid copolymers.

The reinforcing effects of the use of glass fiber in vulcanized elastomer-resin compounds are found in compounds in a wide range of hardness obtained by varying the ratio of the elastomeric component to the resinous component. The proportions of the elastomer to the resin considered to be within the scope of this invention can vary from 15 to 400 parts by weight of the elastomer to 100 parts of resin.

The reinforcing glass fiber must make up at least 10% by weight of the total composition in order to obtain significant improvement in the properties. The upper useful limit is 50% of the total composition. When a higher proportion is used the compound cannot be processed in the usual rubber equipment, it does not cohere and will not flow in milling and molding.

The glass fibers found useful in this invention may have a diameter from $1 \times 10^{-3}$ inch to $1 \times 10^{-6}$ inch. In order to obtain reinforcement the length of the fibers should not be less than about 10 diameters. The number average length may vary from $\frac{1}{64}$ inch to $\frac{1}{8}$ inch. The glass fibers are dispersed throughout the vulcanizate and act to reinforce in all directions.

While the foregoing description sets forth a number of specific embodiments of this invention and suggests certain variations thereof, it is to be understood that the invention is not to be limited thereto, except as may be required by the appended claims.

Having thus described my invention, what I claim as new and desire to secure by Letters Patent of the United States is:

1. A dimensionally stable vulcanizate of 15 to 400 weight parts of vulcanizable elastic rubber selected from the group consisting of conjugated diolefin polymers and polychloroprene; 100 weight parts of compatible and at least partially vulcanizable resin selected from the group consisting of polystyrene, resinous copolymers of styrene and butadiene, phenol-formaldehyde resin, resorcinol-formaldehyde resins, resinous copolymers of butadiene and acrylonitrile, and 10% to 50% by weight of the total vulcanizate of short length glass fiber reinforcement having a diameter of from $1 \times 10^{-3}$ inch to $1 \times 10^{-6}$ inch and a length of from $\frac{1}{8}$ inch to $\frac{1}{64}$ inch dispersed therein.

2. A dimensionally stable product having high cut and abrasion resistance and comprising essentially a vulcanizate of a rubbery copolymer of butadiene and styrene with a larger amount of butadiene, a resinous copolymer of styrene and butadiene, the weight ratio of said rubbery copolymer to said resinous copolymer being about 2 to 3, and glass fiber reinforcement having a diameter from $1 \times 10^{-3}$ inch to $1 \times 10^{-6}$ inch and a length of from $\frac{1}{8}$ inch to $\frac{1}{64}$ inch comprising about 34% by weight of the product dispersed therein, said product having a tensile strength of about 2760 p. s. i., a hardness (Shore D) of about 72, and an impact strength (notched Izod) of about 6.6 ft. lbs./inch.

3. A dimensionally stable product having high cut and abrasion resistance and comprising essentially a vulcanizate of about 25% by weight of a rubbery copolymer of butadiene and styrene with a larger amount of butadiene, about 36% by weight of an approximately equal mixture of styrene-butadiene resin with polystyrene, and about 30% by weight of glass fiber reinforcement having a diameter of from $1 \times 10^{-3}$ inch to $1 \times 10^{-6}$ inch and a length of from $\frac{1}{8}$ inch to $\frac{1}{64}$ inch dispersed therein.

4. A dimensionally stable vulcanizate of a rubbery copolymer of butadiene and styrene with a larger amount of butadiene, a resinous copolymer of styrene and butadiene, the weight ratio of said rubbery copolymer to said resinous copolymer being approximately 8 to 7, polystyrene in a weight ratio of polystyrene to the other polymeric materials of approximately 2 to 7, and glass fiber reinforcement having a diameter of $1 \times 10^{-3}$ inch to $1 \times 10^{-6}$ inch and a length of from $\frac{1}{8}$ inch to $\frac{1}{64}$ inch comprising approximately 30% by weight of the vulcanizate dispersed therein.

5. A dimensionally stable vulcanizate of a vulcanizable elastic rubber selected from the group consisting of conjugated diolefin polymers and polychloroprene; a resinous copolymer of styrene and butadiene that is at least partially vulcanized, the weight ratio of rubber to resin being from about 2:3 to about 2:1; and from about 10% to about 50% by weight of short length glass fiber reinforcement having a diameter of from $1 \times 10^{-3}$ to $1 \times 10^{-6}$ inch and a length of from $\frac{1}{8}$ to $\frac{1}{64}$ inch dispersed therein.

6. A dimensionally stable vulcanizate of 15–400 weight parts of a rubbery copolymer of butadiene and styrene with a larger part of butadiene and 100 weight parts of a resinous copolymer of butadiene with a larger amount of styrene, and 10% to 50% by weight of the total vulcanizate of short length glass fiber reinforcement having a diameter of from $1 \times 10^{-3}$ to $1 \times 10^{-6}$ inch and a length of from $\frac{1}{8}$ to $\frac{1}{64}$ inch dispersed therein.

References Cited in the file of this patent

UNITED STATES PATENTS

| | | |
|---|---|---|
| Re. 23,220 | Jayne et al. | Apr. 18, 1950 |
| 2,407,582 | Soday | Sept. 10, 1946 |
| 2,419,202 | D'Alelio | Apr. 22, 1947 |
| 2,638,457 | Gates | May 12, 1953 |